(12) United States Patent
Moore (10) Patent No.: US 6,640,264 B1
(45) Date of Patent: Oct. 28, 2003

(54) INCREMENTAL STATE LOGIC METHODOLOGY AND APPARATUS FOR LOGIC BASED PROGRAM CONTROL

(76) Inventor: Gary W Moore, 6904 Chinook Dr., Austin, TX (US) 78736

( * ) Notice: Subject to any disclaimer, the term of this patent is extended or adjusted under 35 U.S.C. 154(b) by 89 days.

(21) Appl. No.: 09/119,325

(22) Filed: Jul. 20, 1998

(51) Int. Cl.[7] .................................................. G06F 3/00
(52) U.S. Cl. ................................. 710/29; 713/1; 700/11
(58) Field of Search ............................... 700/11, 2, 6, 7, 700/10, 12, 18, 19, 23; 710/1, 12, 7, 29, 31, 33; 712/225, 37; 713/1, 2

(56) References Cited

U.S. PATENT DOCUMENTS

| | | | | |
|---|---|---|---|---|
| 3,623,585 A | * | 11/1971 | Mason ............................ 197/7 |
| 3,813,649 A | * | 5/1974 | Struger et al. ............ 340/172.5 |
| 4,207,609 A | * | 6/1980 | Luiz et al. ..................... 710/38 |
| 4,224,530 A | * | 9/1980 | Simcoe et al. ............... 307/141 |
| 4,510,565 A | * | 4/1985 | Dummermuth ................ 700/7 |
| 4,831,320 A | * | 5/1989 | Takata ........................ 318/696 |
| 5,051,887 A | * | 9/1991 | Berger et al. ................ 711/162 |
| 5,148,540 A | * | 9/1992 | Beardsley et al. .............. 714/5 |
| 5,675,830 A | * | 10/1997 | Satula ............................ 710/9 |
| 5,867,163 A | * | 2/1999 | Kurtenbach ................. 345/354 |

* cited by examiner

*Primary Examiner*—Jeffrey Gaffin
*Assistant Examiner*—Rijue Mai (57) ABSTRACT

A programmable logic controller (PLC) having a process means, a sampling means, and a diagnostic means, to invoke discrete incremental states representing an infinite number non discrete intermediate input values from electromechanical sensors such as rheostats, resistive pressure gauges, resistive thermal sensors, or the like, within logic based program control sequences. A methodology to employ an infinite number of non discrete intermediate values of voltage, current, or resistance, represented by user-defined incremental states for invoking logic based control sequences to operate electromechanical devices such as solenoids, relays, indicating lamps, or the like. A system comprised of an apparatus and methodology in a singular or plurality of devices provides an operational means to observe, filter, and control, various electrical characteristics for electromechanical devices.

15 Claims, 6 Drawing Sheets

FIG. 1

PRIOR ART

INCREMENTAL STATE LOGIC METHODOLOGY AND APPARATUS FOR LOGIC BASED PROGRAM CONTROL

CROSS-REFERENCES TO RELATED APPLICATIONS

This invention uses the transmission of my co-pending applications, Ser. No. 60/059,107, Filed Sep. 17, 1997, and Ser. No. 60/053,887, Filed Jul. 28, 1997.

FIELD OF THE INVENTION

The present invention relates to programmable logic controllers and specifically to such devices applied to analog inputs under the control of a logic based program control sequence.

BACKGROUND OF THE INVENTION

Programmable logic controllers (PLCs) are specialized miniature computers employed to observe electromechanical device activities, convert activities into data models, apply behavioral parameters from a logical perspective, and based upon variables considered, control external electromechanical devices such as solenoids, relays, indicating lamps, or the like. PLCs interface electromechanical devices with logic based program control sequences for monitoring, controlling, and enunciating activities specific to an application.

PLC devices are differentiated by the way inputs are sampled and processed. From an input perspective, PLC devices are applied to continuous (real-time) sampling for feedback governing processes or utilized to sample static (snapshot) conditions processed by logic based control sequences. Continuous sampling devices invoke real-time processes for generating controlled outputs in direct proportion to sampled inputs. Such an activity could be comprised of an anti-skid braking system, a servo motor operation, a Computer Numeric Controlled (CNC) machining process, or the like. Static sampling devices on the other hand, invokes a process cycle judging one state against another from a sequence of logic based control functions. As a result, outputs are generated and the process is incremented to a whole new cycle of unrelated control functions. In practice, continuous and static sampling activities from a PLC input perspective, employ separate but distinct process methodologies inclusive of independent hardware and software design approaches.

U.S. Pat. No. 4,831,320, filed May 16, 1989, by Koji Takata, and entitled DUTY FACTOR CONTROL METHOD, depicts a control method for electromechanical actuators of equally discrete intermediate positions. Classic of feedback governing activities, a pulse width control methodology is described to sample ratios between durations of mutually discrete electromechanical states for approximating intermediate conditions. By counting the number of opposing single-bit state changes produced by an electromechanical device and dividing the count by a period of time, an intermediate change in distance, flow, or the like, is estimated. Accordingly, sensor devices producing an infinite number of non-discrete intermediate positions such as rheostats, resistive thermal sensors, or the like, do not generate discrete opposing states that can be counted by the methodology. Besides real-time demands on hardware and software resources to support continual approximations, a sampling means of the methodology fails to facilitate non-discrete intermediate state changes produced by analog sensor devices.

A device such as the sequence type controller depicted in U.S. Pat. No. 4,224,530, filed Sep. 23, 1980, by Robert J. Simcoe, and entitled TIME TO GO AND DIAGNOSTIC DISPLAY FOR ELECTRONIC SEQUENCE TYPE APPLIANCE CONTROLLER, illustrates an electromechanical motorized timer replacement but more importantly, a sequential logic based program control device with static sampling of inputs is presented. Inputs from manually actuated switches and time to go states corresponding to the electronic equivalent of a motorized timer advances a control sequence to a whole new (conditional) process step or incremental (process) state. The incremental process of the control sequence is restricted to mutually discrete input signals representing one of two opposing states.

Simcoe teaches a method and system for an electronic sequence type controller for appliances or the like that provide numerical indications while executing program cycles which a user has selected. As presented, numerical representations produced by a sequential counter indicates a particular control cycle or cycle duration. When input conditions of a particular control cycle are satisfied, the control process is incremented to the next cycle while providing a visual means to follow the process. While a visual display advances or stops at a particular value, the electrical state of all switches and time to go timer conditions responsible for the current control cycle count assume validity. Although a diagnostic feature of the display is presented, actual input state conditions are not directly indicated numerically or by any other display means. Furthermore, input conditions are limited by two discrete opposing states for advancing the incremental process illustrated. Intermediate conditions of an input representing values other than two opposing states are entirely disassociated from a display means, processing means, or diagnostic means presented.

A software development tool used to identify and describe specific I/O points in a PLC system is described in U.S. Pat. No. 5,613,115, filed Dec. 9, 1991, Nicholas T. Gihl and John R. Skach, and entitled METHOD FOR USING PLC PROGRAMMING INFORMATION TO GENERATE SECONDARY FUNCTIONS SUCH AS DIAGNOSTIC AND OPERATOR INTERFACE. A user-developed control program with various diagnostic, status, alarm, and user control functions is generated from descriptive comments to operate PLC devices. The Prior Art depiction illustrates the use of electromechanical devices such as push buttons, limit switches, relays, or the like, to satisfy input requirements of a logic based program control sequence. The methodology fails to identify or provide a process means or a control means to recognize, specify, or enable electromechanical devices possessing an infinite number of non-discrete intermediate (analog) state conditions such as resistive, voltaic, or current operated devices deriving more than two discrete opposing logic states. Clearly, analog inputs were never intended to be used with the Prior Art methodology depicted because the process means fails to characterize intermediate non-discrete states as a variable of logic based program control sequences.

Because PLC devices are valued for their ability to control electromechanical devices based upon user-defined input scenarios, extreme importance is focused upon legitimate input strategies. Fail-safe designs are adopted that recognize the potential for input sensor or sensor wiring failure. General practice assumes that an input circuit will break electrical contact leaving a predictable (fail-safe) logic state based upon the placement of current sourcing or current sinking resistors at the PLC input terminals. Fail-safe strategies for two-state sensor circuits neglect to isolate circuit failure from sensor activity. When the electrical contacts of a sensor device become damaged due to longevity, corrosion, abuse, neglect or the like, electrical resistance continues to increase over time. Likewise, damaged contact cycles may vary slightly in resistance from one actuation to another. Theoretically, a number of these cycles could go undetected resulting in process errors of a logic based program control sequence.

Since binary logic principles are by definition based on two discrete opposing states, signal levels outside the domain of (active) ones and (de-active) zeros must be converted to signals PLC devices recognize. Converters and I/O modules interface analog signals with logic based control sequences. Converters detect specific attributes from analog sources to generate logic states for PLC input requisites. Limited by hardware constraints targeted to specific tasks, converters are ridged pre-configured devices. Employing data bus protocols controlled by logic based program control sequences, highly adaptive I/O modules convert analog signals into digital (magnitude) values. Logic based program control sequences cannot utilize these raw data values without extensive algorithms to quantify, qualify, and compare against. For this reason, I/O modules consume significantly more hardware and software resources to manage. Defining magnitude values in terms pertaining to human perception is inherently more difficult to accomplish because numerical values represent abstract concepts.

Frequently, it is necessary to gather data such as pressure, temperature, fluid levels, or the like without the need to observe every increment of an infinite number of non-discrete intermediate values produced by voltage, current, or resistive sources. Often, it is sufficient to determine values and ranges such as high, full, medium, low, empty, or similar increments to enlist the benefits of logic based program control sequences. It would be more efficient, from a software and hardware resource perspective, to enlist a methodology that avoided timers and counters to determine ratios, values and ranges. Furthermore, a diagnostic means would be better served from a display means if both sensor and sensor wiring status could be presented. Additionally, it would be more useful to define input scenarios in descriptive terms pertaining to human perception for "real-world" values employing relevant data such high, full, medium, low, empty, or similar increments to enlist non-discrete intermediate values for logic based program control sequences. Consequently, these obstacles among others are easily defeated by preferred embodiments of the present invention.

Objects and Advantages

Accordingly, it is an object of the present invention to provide a sampling means to convert non-discrete intermediate (analog) values of voltage, current, or resistance into user-defined discrete incremental states to satisfy operational requirements of a logic based program control sequence.

Another object of the present invention is to provide a diagnostic feature of a display means to present sensor circuit status represented by user-defined incremental states to characterize sensor devices or circuit wiring.

Still another object of the present invention is to provide a process means to define resistive, voltaic, or current sources as incremental states to satisfy input requirements of a logic based control program sequence.

Yet another object of the present invention is to provide a diagnostic feature employing incremental states to identify electrical opens and shorts within sensor circuits for isolating circuit failure.

Another object of the present invention is to provide a user-defined filter means to select significant incremental state transitions for stabilizing sensor status.

Still another object of the present invention is to provide a process means to select specific incremental states for characterizing voltage, current, or resistance values.

Figure 1:
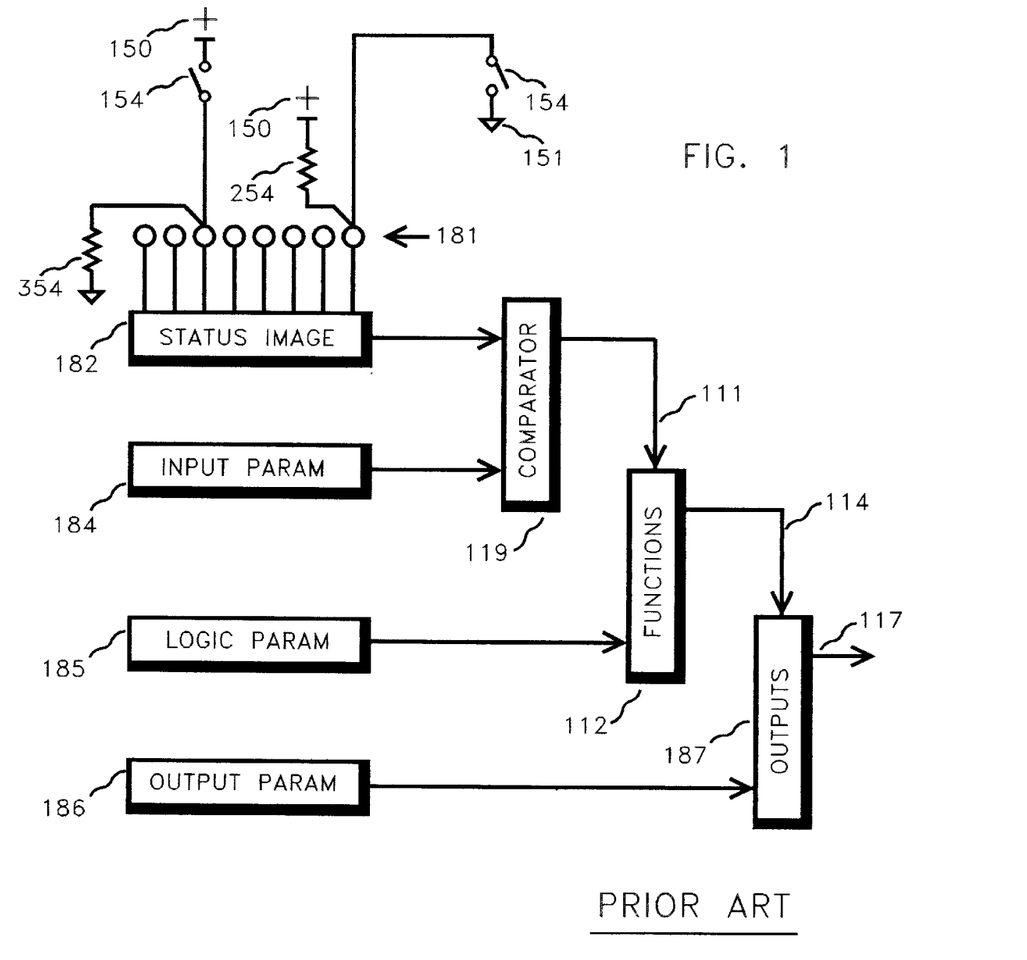
FIG. 1 shows a process diagram of Prior Art for static sampling of hardwired two-state sensor circuit inputs by logic based program control sequences to generate control outputs.

REFERENCE NUMERALS IN DRAWINGS 111 control bit representing comparator results
112 boolean algebraic functions
114 control bit representing algebraic results
117 discrete control outputs controlling electromechanical devices
119 bit-to-bit comparator
150 power source
151 ground return reference
153 analog sensor device
154 two-state sensor contacts
155 resistive current device
157 analog sensor device
159 input converter
165 user-defined transformation ratio generating incremental states
166 user-defined mathematical hysteresis
181 hard-wired input terminals
182 two-state input status in memory
182-A user-defined incremental state 1 status in memory
182-B user-defined incremental state 2 status in memory
182-C user-defined incremental state 3 status in memory
184 user-defined two-state input parameter in memory
184-A user-defined incremental state 1 input parameter in memory
184-B user-defined incremental state 2 input parameter in memory 184-C user-defined incremental state 3 input parameter in memory
185 user-defined logic sequence parameters in memory
186 user-defined output parameters in memory
187 output drivers
191 resistive current device
254 current sourcing resistor
281 hard-wired input terminals
259 binary numeric value
265-A incremental state 1 representing converted input
265-B incremental state 2 representing converted input
265-C incremental state 3 representing converted input
266 stabilized binary numeric value
315 lower threshold of hysteresis
316 upper threshold of hysteresis
317 lower threshold of hysteresis
318 upper threshold of hysteresis
319 lower threshold of hysteresis
320 upper threshold of hysteresis
321 signal amplitude of zero
322 delimiter between states
323 delimiter between states
324 delimiter between states
325 maximum signal amplitude
326 incremental state 1
327 incremental state 2
328 incremental state 3
329 incremental state 4
332 signal amplitude representing an incremental state
333 signal amplitude representing an incremental state
334 input signal from analog sensor circuit (ideal conditions)
335 incremental states generated from input signal
340 incremental state transition error
341 incremental state transition error
342 incremental state transition error
350 analog input signal (ideal conditions)
351 input signal from two-state sensor circuit
352 analog input signal with voltages electrically induced into sensor circuit
353 analog input signal with voltages electrically induced into sensor circuit
354 current sinking resistor
426 incremental state representing electrical short circuit (SHORT CIRCUIT)
427 incremental state representing closed switch contacts (ON)
428 incremental state representing open switch contacts (OFF)
429 incremental state representing electrical open circuit (OPEN CIRCUIT)
434 signal representing opposing state sensor circuit
435 incremental states generated from input signal
534 signal representing analog sensor circuit with induced electrical voltages
535 incremental states generated from input signal
634 signal representing analog sensor circuit with induced electrical voltages
635 incremental states generated from input signal Description Of Drawings A Prior Art process illustrated in FIG. 1 applies a logic based program control sequence for static (snapshot) sampling of hard-wired inputs 181 to evaluate two opposing state electromechanical sensors 154 for generating control outputs 117. A PLC device possesses an input means 181 to monitor opposing state sensor activity, memory to store input status 182, memory to store user-defined input parameters 184, memory to store and execute logic sequences 185, memory to store output parameters 186, and an output means 117 to control electromechanical devices (not shown) such as solenoids, relay contacts, indicating lamps, or the like.

A fail-safe design approach ensures predictable failure conditions by implementing current sourcing 254 or current sinking 354 resistors deriving power 150 and ground 151 at the PLC input terminals 181. One of two possible default fail-safe states mimic either an activated or de-activated sensor state when electrical continuity of a sensor or sensor wiring fails. Fail-safe conditions are not unique to input status and therefore indistinguishable from normal sensor status stored in memory 182. Each status bit stored in memory 182 represents one hard-wired input.

A bit-for-bit relationship exists between hard-wired inputs 181, input status 182, and user-defined input parameters 184 for comparison 119 to yield an equal/not equal 111 control bit. User-defined logic parameters 185 utilize boolean algebraic functions 112 to control 114 output drivers 187 designated by user-defined output parameters 186 for toggling discrete outputs 117.

Figure 2:
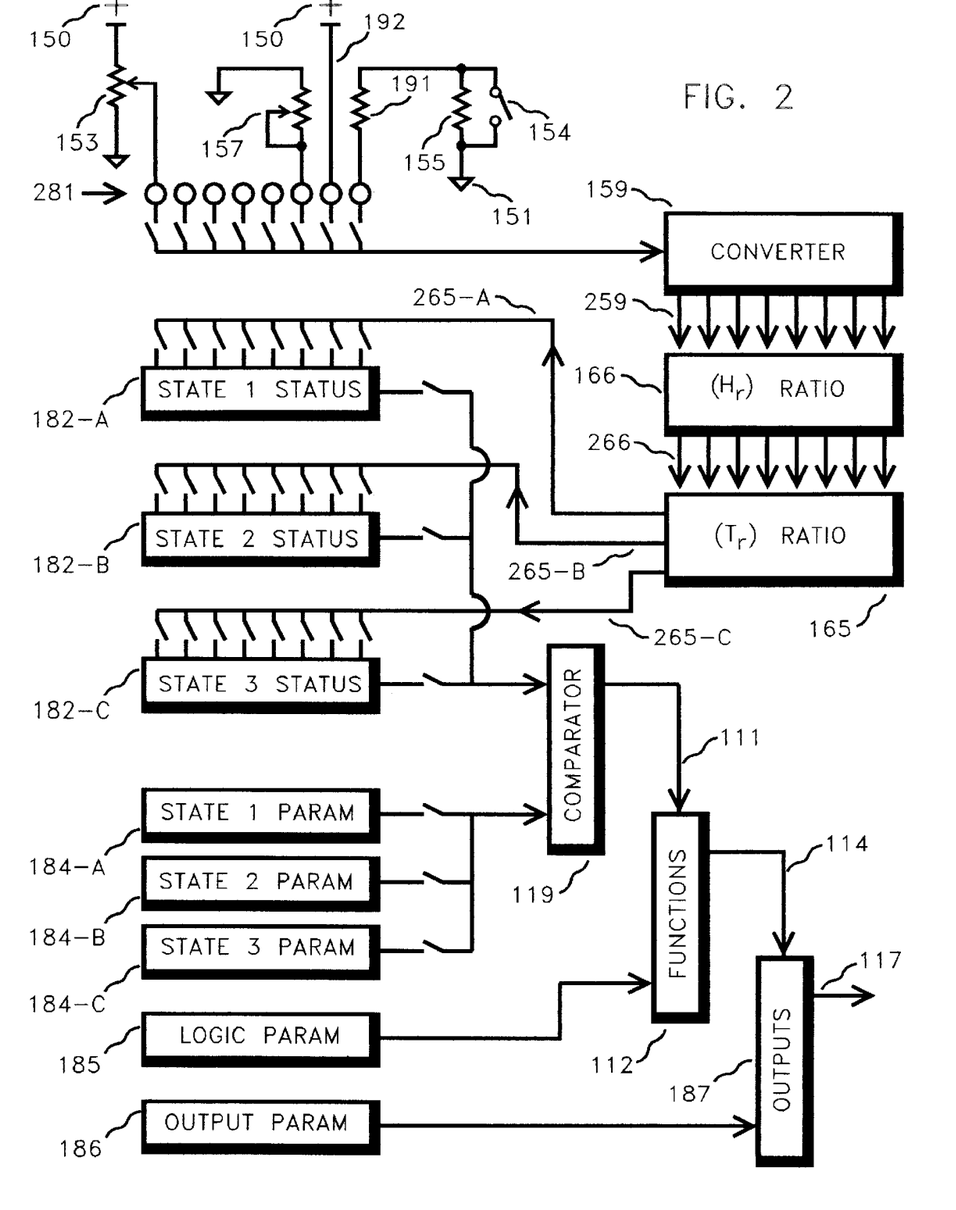
FIG. 2 shows a process diagram of Prior Art for static sampling of hardwired analog sensor circuit inputs by logic based program control sequences to generate control outputs.

A preferred embodiment of the present invention illustrated in FIG. 2 applies a logic based program control sequence for static (snapshot) sampling of hard-wired inputs 281 to evaluate an infinite number of non-discrete intermediate values of an electromechanical analog sensor device 153, 157 for generating control outputs 117. A PLC device possesses an input means 281 to monitor analog sensor activity, memory to store input status 182-A, 182-B, 182-C, memory to store user-defined input parameters 184-A, 184-B, 184-C, memory to store and execute logic sequences 185, memory to store output parameters 186, and an output means 117 to control electromechanical devices (not shown) such as solenoids, relay contacts, indicating lamps, or the like. Fail-safe designs used in Prior Art approaches have been abandoned and replaced by preferred embodiments of the present invention that employ unique states to represent electrical breaks in wired input sensor connections.

FIG. 2 depicts various hard-wired sensor input circuits 281 generating voltage 153, resistance 157, or current 155. Inputs are singularly converted 159 to a digital (binary) value 259 and a user-defined mathematical hysteresis 166 (see description of FIG. 3) is applied to the converted input value 259 to produce a stabilized input signal value 266. The stabilized value is divided by a user-defined transformation ratio 165 to yield a singular bit representing an incremental state 265-A, 265-B, 265-C and stored in memory with like states of other inputs. The processes is repeated for all inputs to produce one status bit for each incremental input state and stored in memory for further processing.

For illustration purposes only, FIG. 2 depicts three incremental state status registers 182-A, 182-B, 182-C and three user-defined input parameter registers 184-A, 184-B, 184-C representing for example, HIGH, MEDIUM, LOW for an input voltage level 153 or FULL, LOW, EMPTY for resistance measurement 157 or ON, OFF, OPEN CIRCUIT for an electrical current value 155. Specifying relevant characteristics of a voltage, resistance, or current in definable states incorporates a preferred embodiment of the present invention that enables logic based program control sequences to utilize analog inputs. It is indicative of incremental states stored in memory as status or input parameters to flag all hard-wired inputs possessing like status. For example, two status images 182-A, 182-B are cleared and the third status image 182-C is set to all binary "ones" when all inputs 281 are open circuits. As one input changes state from "open circuit" to "on", one status image bit representing the hard-wired input is cleared and a bit representing the input is set in another status image.

A bit-for-bit relationship exists between compressed input status expressed in incremental states 182-A, 182-B, 182-C, and user-defined input parameters 184-A, 184-B, 184-C for comparison 119 to yield an equal/not equal 111 control bit. User-defined logic parameters 185 utilize boolean algebraic functions 112 to control 114 output drivers 187 designated by user-defined output parameters 186 for toggling discrete outputs 117.

Figure 3:
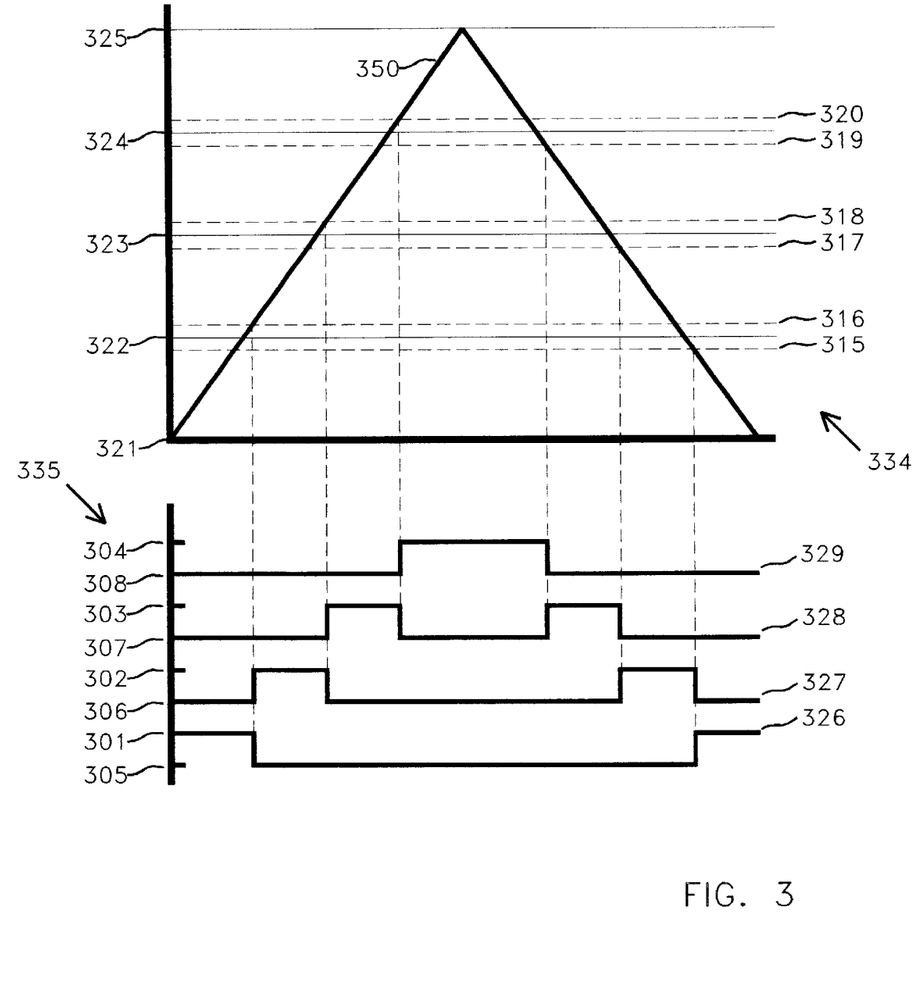
FIG. 3 shows how incremental states are used to characterize hard-wired analog sensor circuits under ideal conditions.

FIG. 3 shows how incremental states 335 are used to characterize signals from hard-wired analog sensor circuits 334 under ideal conditions. An input signal 350 from an analog device (such as a sensor 153 illustrated in FIG. 2) is depicted rising in amplitude from zero 321 to a maximum level 325 and decreasing over time back to zero 321. In this example, a process of the present invention generates one of four incremental states 326, 327, 328, 329 compatible with logic based program control sequences of a PLC to characterize electromechanical analog sensor devices and circuit wiring.

A process know as hysteresis employs level detection for upper threshold 316, 318, 320 and lower threshold 315, 317, 319 trigger points from a center reference state delimiter 322, 323, 324 to prevent indiscriminate state changes when unstable input signal levels (see transition errors described in FIG. 6) are encountered. A signal rising in amplitude and crossing an upper threshold value or a signal dropping in amplitude and crossing a lower threshold value invokes one of six illustrated incremental state changes representing one of four incremental states 326, 327, 328, 329. Only one incremental state is active at any given moment in time with respect to an input condition.

Referring back to FIG. 2, two series resistors 155, 191 and switched contacts 154 of a sensor device formulate an input circuit capable of generating four incremental states: (1) two series resistors when the switch contacts are open, (2) one resistor when the switch contacts are closed, (3) an electrical short with zero resistance, and (4) an electrical open circuit with an infinite resistance. To further illustrate a methodology means for qualifying input sensor devices and sensor wiring, a relationship between these components and incremental states of the present invention will be presented in the ensuing description of FIG. 4.

Figure 4:
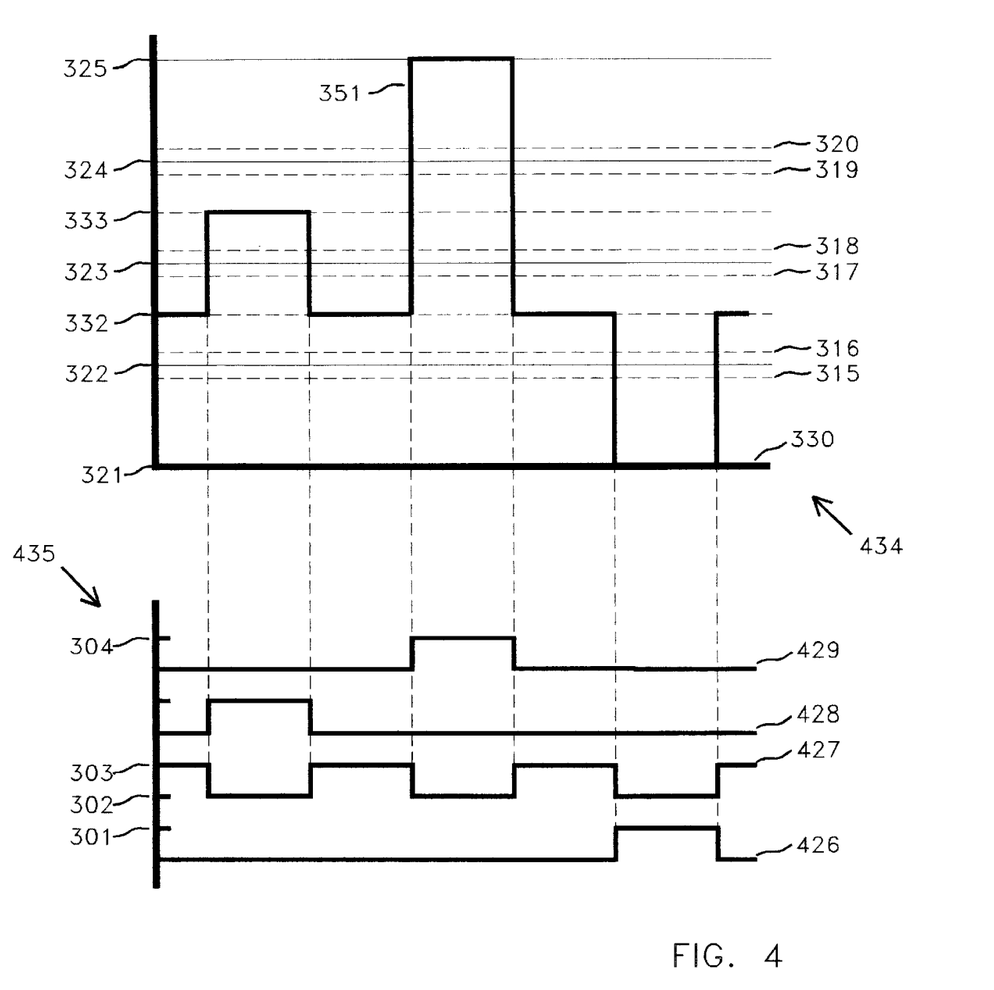
FIG. 4 shows how incremental states are used to characterize hard-wired opposing state sensor circuits.

FIG. 4 shows how incremental states 435 are used to characterize hard-wired signals from opposing state sensor circuits 434. The amplitude of an input signal 351 is proportional to the circuit resistance produced by open sensor contacts 333, closed sensor contacts 332, an electrical short circuit 321, or an open circuit 325 mimicking a broken wire. Applying the same hysteresis principles described for FIG. 3, transitioning points for generating one of four incremental states are as follows:

1) initial closed switch contacts (ON) 427 to open switch contacts (OFF) 428;

2) from open switch contacts (OFF) 428 to closed switch contacts (ON) 427;

3) from closed switch contacts (ON) 427 to (OPEN CIRCUIT) 429;

4) from (OPEN CIRCUIT) 429 to closed switch contacts (ON) 427;

5) from closed switch contacts (ON) 427 to (SHORT CIRCUIT) 426;

6) from (SHORT CIRCUIT) 426 to closed switch contacts (ON) 427.

Figure 5:
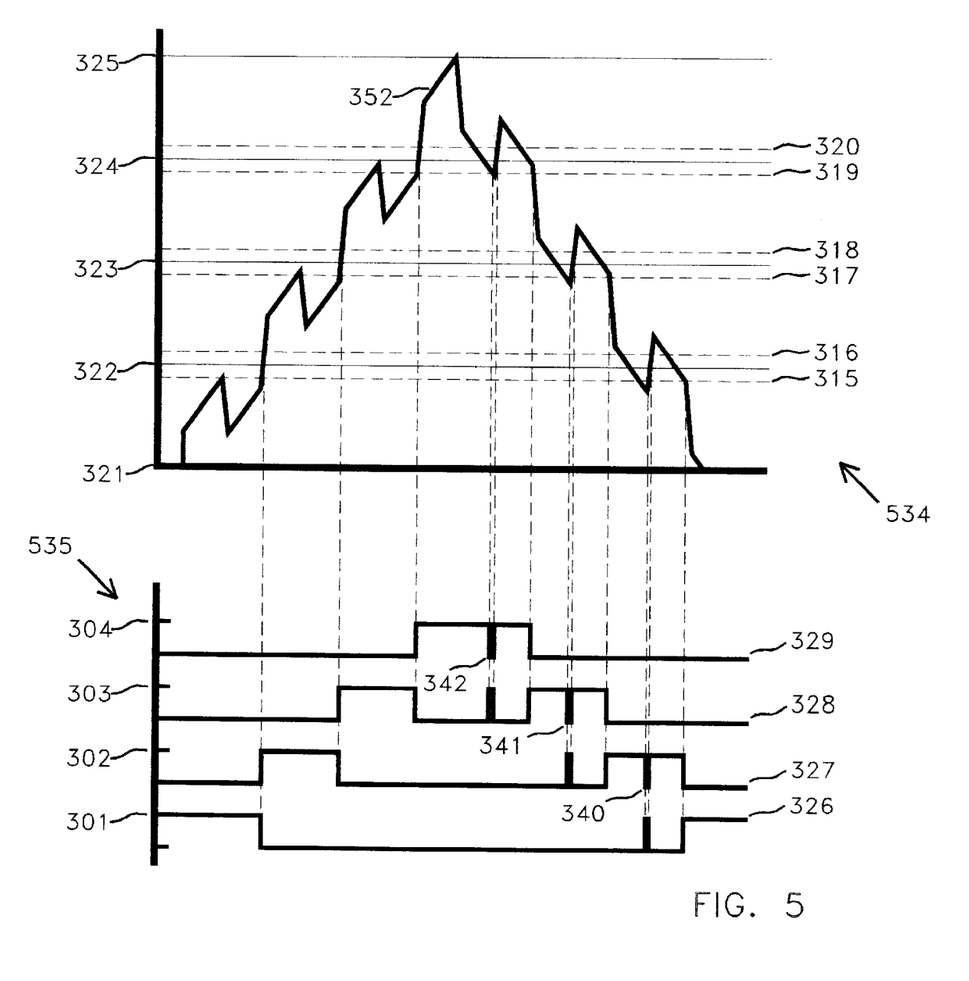
FIG. 5 shows how incremental states are used to characterize hard-wired analog sensor circuits under extreme conditions of induced electrical voltages and rationalizes the merits of implementing a user-defined filtering means for stabilizing logic based program control sequences.

Increasing the number of fixed increments between two points decreases distinguishable attributes between them. Each additional increment represents a smaller change until each change becomes too insignificant to detect. I/O modules can measure several thousand increments when an analog voltage is converted to a digital value. Eleven (11) bits represent 2,048 increments for magnitude comparisons. When small electrical voltages typically induced as interference into sensor circuits are present, magnitude comparisons contain error margins that additional processes must correct. However, FIG. 5 shows how incremental states 535 are used to characterize signals from hard-wired analog sensor circuits 534 under extreme conditions of induced electrical voltages and rationalizes the merits of implementing a user-defined filtering means for stabilizing logic based program control sequences.

Employing a description of hysteresis for FIG. 3, voltages electrically induced into input signals 352 produce false transitional "glitches" 342, 341, 340 that produce incremental state errors. This becomes immediately apparent when compared to a "clean" signal 350 depicted in FIG. 3 under more ideal conditions. The risk of momentary false states residing in status memory for several cycles of a logic based program control sequence exposes a PLC device to discrete output control errors and illustrates the necessity for a user-defined filtering means to stabilize input status.

Figure 6:
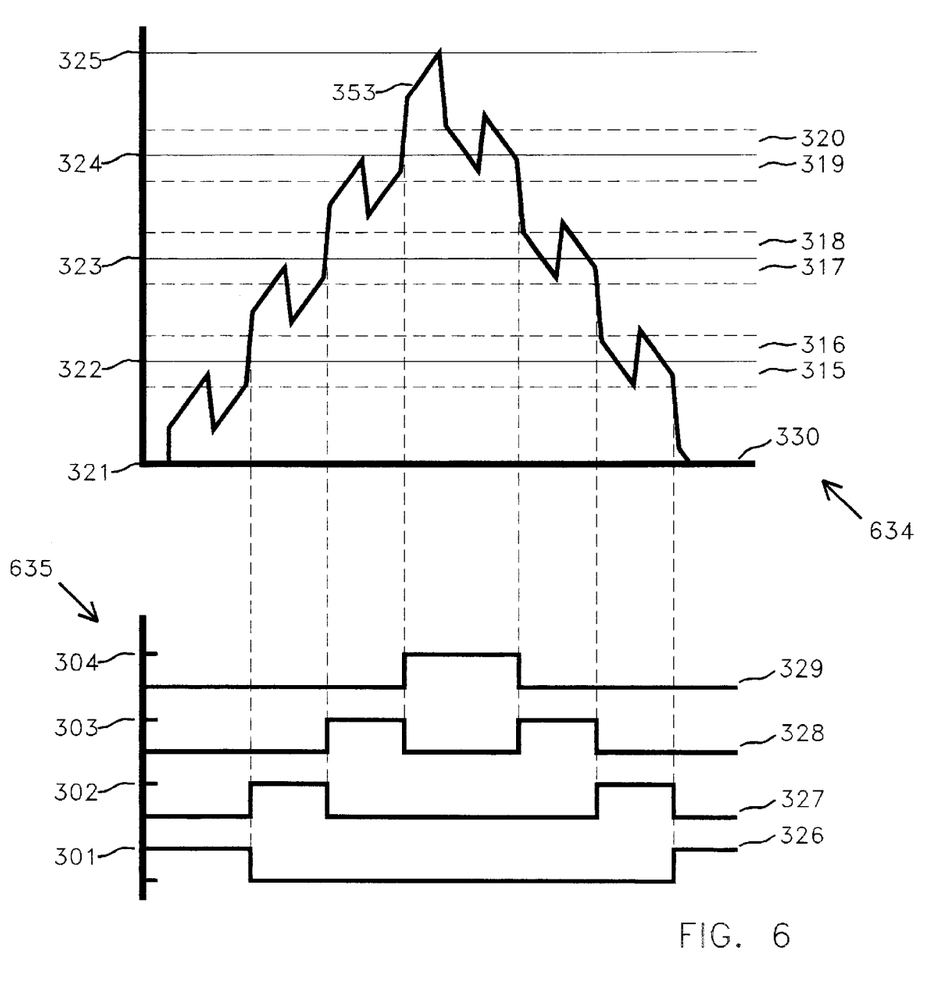
FIG. 6 shows how incremental states are used to characterize hard-wired analog sensor circuits under extreme conditions of induced electrical voltages and illustrates an implementation of a user-defined filtering means to stabilize relevant signal characteristics.

FIG. 6 shows how incremental states 635 are used to characterize hard-wired analog sensor circuits 634 under extreme conditions of induced electrical voltages and illustrates an implementation of a user-defined filtering means to stabilize relevant signal characteristics. Applying the same hysteresis principles described for FIG. 3, transition errors 340, 341, 342 illustrated in FIG. 5 have been eliminated by increasing upper and lower thresholds of a user-defined hysteresis for input signals 350, 352, 353, of equal amplitude. One should recognize by comparison of FIGS. 3, 5, and 6, that user-defined hysteresis emulates a filtering means of the present invention when applied to incremental states for logic based program control sequences.

Summary, Scope, and Ramifications

Accordingly, a methodology and apparatus of the present invention is used to sample, convert, display, define, and filter specific attributes of (analog) sensor circuits employing an infinite number of non-discrete intermediate values of voltage, current, or resistance as parameters of a logic based program control sequence. A methodology resides within the memory of an apparatus to implement user-defined incremental states for processing analog signals from sensor devices such as rheostats, resistive thermal sensors, or the like, for logic based program control sequences. Furthermore, a methodology and apparatus has additional advantages in that:

it accurately assesses analog sensor devices such as rheostats, resistive thermal sensors, or the like to produce user-defined incremental states for judging one incremental state against another to satisfy operational requirements of a logic based program control sequence;

it provides visual status of input sensor status through user-defined incremental states characterizing values rational to human perception;

it satisfies process requirements of a logic based control program sequence by converting voltage, current, and resistance into discrete incremental states;

it equates electrical opens and shorts with unique incremental states for isolating input circuit faults;

it provides a user-defined filter means to stabilize sensor status for judging one incremental state against another;

it provides user-defined incremental states for characterizing voltage, current, or resistance, that are rational to human perception.

The present invention introduces new techniques for interfacing analog signals with control sequences of an apparatus such as a programmable logic controller (PLC) device. Ignoring quantitative bit-for-bit magnitude comparisons techniques, a methodology considers more relevant variables for characterizing voltage, current, and resistance in user-definable increments hereinafter referred to as incremental states. Incremental states represent equal divisions of a signal amplitude between fixed minimum and maximum values enhanced with Hysteresis for stabilizing transitions from one incremental state to another. Within logic based program control sequences of an apparatus are user-defined parameters designating input scenarios for toggling outputs on and off to control electromechanical devices such as solenoids, relays, indicating lamps, or the like, specific within an application to which the system is applied. Input scenarios are defined in terms of incremental states to compress an infinite number non-discrete intermediate values of voltage, current, or resistance to formulate user-defined program control sequences employing analog inputs. As a result, numerous benefits are realized by preferred embodiments of the present invention.

A process samples PLC inputs, converts inputs into binary magnitudes, and compresses input magnitudes into incremental states. User-defined compression ratios transform input magnitudes into equal increments between fixed minimum and maximum limits to characterize input levels and ranges. The resolution of an input magnitude is characterized by the formula:

$$S_d = 2^{(n)}$$

Where:
n equals the number of digital bits employed to represent an input amplitude,
$S_d$ equals digital states of equal increments between minimum and maximum limits.

A compression ratio or transformation process that produce incremental state values is represented by the formula:

$$S_d / T_r = |S_t|$$

Where:
$S_d$ equals digital states,
$T_r$ equals transformation ratio $\leq S_d$,
$S_t$ equals total number of incremental states.

Utilizing magnitude sampling, a transformation process is characterized by the formula:

$$S_a / T_r = |S_n|$$

Where:
$S_a$ equals AID magnitude appraisal,
$S_n$ equals incremental state number.

An embodiment of the present invention employs a filtering means or hysteresis to eliminate the negative effects of electrically induced voltage into electromechanical sensors and sensor wiring. The gap between upper and lower switching threshold values that produce incremental state transitions are optimized through user-defined hysteresis ratios to more accurately represent input conditions. A hysteresis voltage $E_{hyst}$ is characterized by the formula:

$$E_{hyst} = 2E_{max} / HS$$

Where:
$E_{max}$ equals the maximum amplitude in volts
H equals a hysteresis ratio greater than one and less than or equal to the resolution,
S equals the number of states.

The center voltage $E_{ctr}$ of an incremental state transition point for both an increasing and decreasing analog signal without hysteresis is characterized by the formula:

$$E_{ctr} = E_{max} / S$$

The lower threshold voltage $E_{lt}$ of an incremental state represents a transition point for a decreasing analog signal characterized by the formula:

$$E_{lt} = E_{ctr} - 2 / E_{hys}$$

The upper threshold voltage $E_{ut}$ of an incremental state represents a transition point for an increasing analog signal characterized by the formula:

$$E_{ut} = E_{ctr} + 2 / E_{hys}$$

A methodology enables a system to recognize analog input signal levels or ranges represented by incremental states defined within logic based program control sequences to identify wiring, sensor, and electrically induced voltages associated with PLC inputs. Signal extremes are utilized to identify electrically open or shorted circuit wiring including potential sensor failure. Unique states are specified to satisfy input parameters of a logic based control sequence while other states are employed to detect levels, ranges, and out of tolerance conditions for sensor circuits. Separate output activities are generated for each state specified in a control sequence and can be used to identify both valid and invalid conditions.

Although the description above contains many specifications, these should not be construed as limiting the scope of the present invention but as merely providing illustrations of some of the presently preferred embodiments of the invention. For example, a methodology presented herein may be applied to separate hardware devices interfacing analog signals to logic based program control sequences without deviating from the preferred embodiments of the present invention.

I claim:

1. In a programmable controller for implementing logic based program control sequences of an operating system, wherein a process is applied to convert non-discrete intermediate state conditions into discrete incremental logic states for judging one incremental state against another in a device further comprising:

a read only memory (ROM) to store operating system for orchestrating system level operations;

a random access memory (RAM) to store operational status and user-defined control sequences for executing logical functions responsible for generating response activities;

a processor to execute instruction sequences from memory for directing data flow between hardware elements of a system that encompasses a programmable controller device;

inputs and outputs for connectivity to external devices and user interfaces to satisfy input/output (I/O) parameters of a control or operating sequence;

means to sample non-discrete intermediate values of an input signal source for voltage, resistance, or current;

means to apply user-defined compression ratios to sampled inputs for producing discrete states in equal increments between fixed minimum and maximum values whereby non-discrete intermediate state values are compressed into a subset of their original values;

means to apply user-defined hysteresis to select transition points from one incremental state to another;

means to represent magnitude values for voltage, resistance, or current, in incremental logic states for integrating non-discrete intermediate signal sources with logic based control sequences.

2. A process of claim 1 to judge the validity of a non-discrete intermediate value represented within a logic based program control sequence further comprised of specific logic states representing circuit failures within a sampled sensor circuit.

3. A process of claim 1 to filer out undesirable electrical interference induced into sensor circuits comprised of user-defined transition points generating one incremental state over another by selectively avoiding transition points affected by induced electrical interference.

4. A process of claim 1 to utilize incremental states for characterizing specific signal values and ranges comprised of a selection of one or more incremental states representing any number of non-discrete intermediate values of a sensor circuit.

5. A process of claim 1 for implementing diagnostic advantages to judge and react to specific incremental states corresponding to sensor errors, electrical open circuits, and electrical short circuits.

6. In a hardware device devoid of a processor and memory, wherein a methodology is employed to convert non-discrete intermediate state conditions into discrete incremental logic states for judging one incremental state against another in a device further comprising:

inputs and outputs for connectivity to external devices and interfaces to satisfy conditional input/output (I/O) parameters of said hardware device;

means to sample non-discrete intermediate values of an input signal source for voltage, resistance, or current;

means to apply compression ratios to sampled inputs for producing discrete states in equal increments between fixed minimum and maximum values whereby non-discrete intermediate state values are compressed into a subset of their original values;

means to apply hysteresis to select transition points from one incremental state to another;

means to represent magnitude values for voltage, resistance, or current, in incremental logic states for integrating non-discrete intermediate signal sources in a hardware device devoid of a processor and memory.

7. A process of claim 6 to judge the validity of a non-discrete intermediate value comprised of specific output states representing circuit failures within a sampled sensor circuit.

8. A process of claim 6 to filer out undesirable electrical interference induced into sensor circuits comprised of user-defined transition points generating one incremental state over another by selectively avoiding transition points affected by induced electrical interference.

9. A process of claim 6 to utilize incremental states for characterizing specific signal values and ranges comprised of a selection of one or more incremental states representing any number of non-discrete intermediate values of a sensor circuit.

10. A process of claim 6 for implementing diagnostic advantages to judge and react to specific incremental states corresponding to sensor errors, electrical open circuits, and electrical short circuits.

11. In a computer system for implementing logic based program control sequences of an operating system, wherein a process is applied to convert non-discrete intermediate state conditions into discrete incremental logic states for judging one incremental state against another in a device further comprising:

a read only memory (ROM) to store operating system for orchestrating system level operations;

a random access memory (RAM) to store operational status, operating sequences, and user-defined control sequences wherein operating sequences define functionality of a process and control sequences provide means for executing user-defined logical functions responsible for generating response activities;

a processor to execute instruction sequences from memory for directing data flow between hardware elements of a system that encompasses a computer system;

inputs and outputs for connectivity to external devices and user interfaces to satisfy input/output (I/O) parameters of a control or operating sequence;

means to sample non-discrete intermediate values of a signal representing voltage, resistance, or current;

means to apply user-defied compression ratios to signal values for producing discrete states in equal increments between fixed minimum and maximum values whereby non-discrete intermediate state values are compressed into a subset of their original values;

means to apply user-defined hysteresis to select transition points from one incremental state to another;

means to represent magnitude values for voltage, resistance, or current, in incremental logic states for integrating non-discrete intermediate signal values with logic based control sequences.

12. A process of claim 11 to judge the validity of a non-discrete intermediate value represented within a logic based program control sequence further comprised of specific logic states representing circuit failures within a sampled sensor circuit.

13. A process of claim 11 to filer out undesirable electrical interference induced into sensor circuits comprised of user-defined transition points generating one incremental state over another by selectively avoiding transition points affected by induced electrical interference.

14. A process of claim 11 to utilize incremental states for characterizing specific signal values and ranges comprised of a selection of one or more incremental states representing any number of non-discrete intermediate values of a sensor circuit.

15. A process of claim 11 for implementing diagnostic advantages to judge and react to specific incremental states corresponding to sensor errors, electrical open circuits, and electrical short circuits.

* * * * *